(12) United States Patent
Sparks

(10) Patent No.: US 8,152,059 B2
(45) Date of Patent: Apr. 10, 2012

(54) SECURE COMMERCIAL TRANSACTIONS SYSTEM

(76) Inventor: John T. Sparks, Atlanta, GA (US)

( * ) Notice: Subject to any disclaimer, the term of this patent is extended or adjusted under 35 U.S.C. 154(b) by 538 days.

(21) Appl. No.: 12/357,047

(22) Filed: Jan. 21, 2009

(65) Prior Publication Data
US 2009/0184164 A1 Jul. 23, 2009

Related U.S. Application Data

(63) Continuation-in-part of application No. 10/974,045, filed on Oct. 26, 2004, now Pat. No. 7,497,371.

(51) Int. Cl.
G06K 5/00 (2006.01)
(52) U.S. Cl. .................. 235/382; 235/380; 235/379
(58) Field of Classification Search .......... 235/379, 235/380, 382
See application file for complete search history.

(56) References Cited

U.S. PATENT DOCUMENTS

| | | |
|---|---|---|
| 3,806,874 A | 4/1974 | Ehrat |
| 4,582,985 A | 4/1986 | Lofberg |
| 4,801,787 A | 1/1989 | Suzuki |
| 4,864,108 A | 9/1989 | Hamada et al. |
| 4,908,608 A | 3/1990 | Reinke et al. |
| 4,928,001 A | 5/1990 | Masada |
| 4,959,788 A | 9/1990 | Nagata et al. |
| 4,991,008 A | 2/1991 | Nama |
| 5,058,161 A | 10/1991 | Weiss |
| 5,097,505 A | 3/1992 | Weiss |
| 5,101,200 A | 3/1992 | Swett |
| 5,253,167 A | 10/1993 | Yoshida et al. |
| 5,259,649 A | 11/1993 | Shomron |
| 5,354,974 A | 10/1994 | Eisenberg |
| 5,386,104 A | 1/1995 | Sime |
| 5,396,218 A | 3/1995 | Olah |
| 5,457,747 A | 10/1995 | Drexler et al. |
| 5,548,632 A | 8/1996 | Walsh et al. |
| 5,557,686 A | 9/1996 | Brown et al. |
| 5,585,787 A | 12/1996 | Wallerstein |
| 5,590,038 A * | 12/1996 | Pitroda .................. 705/41 |
| 5,721,765 A | 2/1998 | Smith |
| 5,731,575 A * | 3/1998 | Zingher et al. .......... 235/379 |
| 5,764,789 A | 6/1998 | Pare, Jr. et al. |
| 5,774,546 A | 6/1998 | Handelman et al. |
| 5,780,825 A | 7/1998 | Sato et al. |
| 5,870,723 A | 2/1999 | Pare, Jr. et al. |
| 5,987,439 A * | 11/1999 | Gustin et al. ............. 705/43 |
| 6,020,826 A | 2/2000 | Rein |
| 6,062,474 A | 5/2000 | Kroll |
| 6,068,184 A | 5/2000 | Barnett |

(Continued)

OTHER PUBLICATIONS

Kellner, Tomas, "Banking on ATM Safety," Forbes.com, Jan. 28, 2004.

Primary Examiner — Daniel Hess

(57) ABSTRACT

A secure financial transactions system. The system generally includes a card that can be used a credit card, ATM card or debit card having a personal identification number (PIN) that can include a panic digit or panic PIN. The panic digit or panic PIN can be used to begin an emergency notification sequence including sending emergency signals and video transmissions from the commercial transactions machine. The card can include several biometric devices as well as financial transaction records. The card can include data to interact with data gathered from biometric devices on the ATM or POP devices. The card can then be interfaced with a personal computer. The card could also be made into other formats such as a ring, key chain, or other jewelry.

22 Claims, 1 Drawing Sheet

U.S. PATENT DOCUMENTS

| | | |
|---|---|---|
| 6,088,585 A | 7/2000 | Schmitt et al. |
| 6,208,264 B1 | 3/2001 | Bradney et al. |
| 6,308,887 B1 | 10/2001 | Korman et al. |
| 6,400,270 B1 | 6/2002 | Person |
| 6,454,708 B1 | 9/2002 | Ferguson et al. |
| 6,490,366 B1 | 12/2002 | Haneda et al. |
| 6,501,380 B1 | 12/2002 | Jakobsson |
| 6,679,422 B2 | 1/2004 | Brown et al. |
| 2002/0038818 A1 | 4/2002 | Zingher et al. |
| 2002/0116330 A1* | 8/2002 | Hed et al. .................. 705/39 |
| 2003/0009426 A1 | 1/2003 | Ruiz-Sanchez |
| 2005/0111709 A1* | 5/2005 | Topping .................. 382/124 |

* cited by examiner

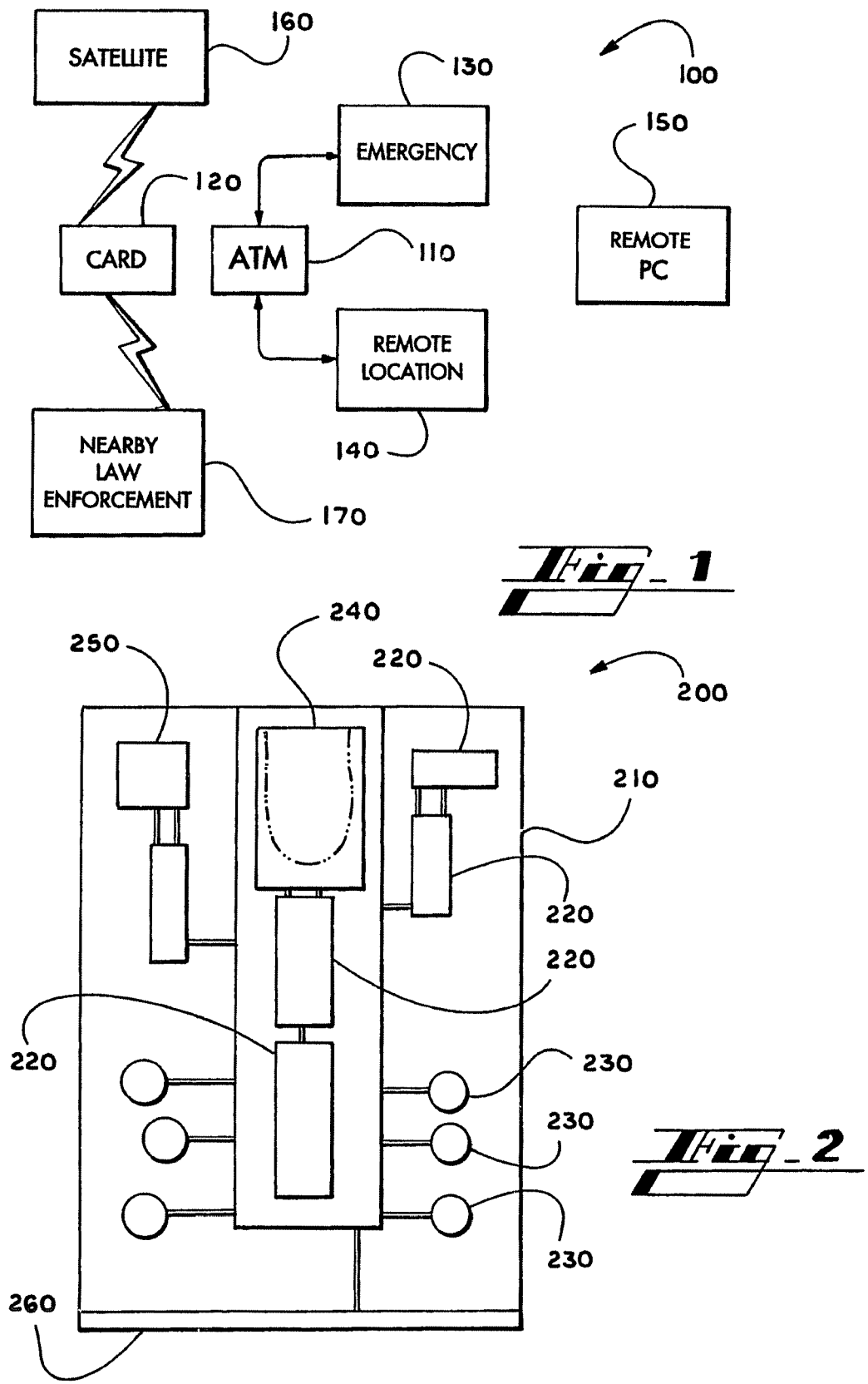

SECURE COMMERCIAL TRANSACTIONS SYSTEM

RELATED APPLICATION

The present U.S. Nonprovisional Utility patent application is a continuation-in-part of, and hereby claims priority to, and the benefit of, U.S. Nonprovisional patent application Ser. No. 10/974,045, filed on Oct. 26, 2004, Now U.S. Pat. No. 7,497,371, Issued on Mar. 3, 2009, and entitled "Secure Commercial Transactions System", on behalf of John T. Sparks, incorporated herein by reference.

BACKGROUND

I. Field

The present disclosure relates generally to the field commercial transaction systems, and more particularly to a secure commercial transactions apparatus and system, wherein a multi-feature transactional device enhances user safety, provides a means of user identify verification, minimizes risk of fraud, facilitates record keeping, and functions as a data collection tool for target marketing.

II. Description of the Related Art

The present use of ATM cards, debit cards, credit cards and the like create potential personal security hazards. For example, users at ATM machines can become robbery victims by having criminals force them to withdraw money. In addition, the loss of such cards can allow criminals to endlessly use the cards without knowledge to the true owner. Further, fraudulent use of counterfeit cards is becoming increasingly prevalent, wherein card numbers and other identifying information printed on cards is furtively collected and utilized to create counterfeit cards.

Additional disadvantages exist relative to currently available transaction cards. For example, a frequent card user is personally saddled with the task of collecting endless printed receipts if crosscheck of bank or credit statements is desired. Moreover, in most instances, even if the user does not desire a print receipt, the receipt is generated nonetheless. Countless tons of environmental waste are undoubtedly generated by ATM's alone.

SUMMARY

In general, the present invention relates to an ATM/credit/debit card that includes a microprocessor, memory, security devices and financial transaction devices. As an ATM or debit card, a personal identification number (PIN) is included as with present ATM and debit cards. The PIN can be a set number of digits, say four. The user typically has two PIN's. One, the normal PIN, allows transactions without any special security function being triggered. The user also typically has another PIN, a "panic" PIN that triggers a series of security devices but appears to the user (or a criminal) to be functioning normally. The normal PIN can also be altered to a "panic" PIN by use of another digit to the normal PIN. This digit is the "panic" digit. In a typical implementation, the user can use the four digit normal PIN to conduct normal financial transactions. However, to provide a security feature at ATMs or other point of purchase (POP) devices, if a criminal forces a user to withdraw money or forces the user to reveal the PIN, the user can key in the second "panic" PIN or the normal four digit PIN plus the fifth panic digit. The financial transaction proceeds as normal so as not to alert the criminal. However, by pressing the "panic" PIN or the "panic" fifth digit, the machine starts a series of protective actions, for example, sending an emergency message such as a 911 call to the local police that there is criminal activity at that location. A camera in the location can go into a higher resolution mode to obtain a better image of the scene. The camera can also go into a format so that only police can erase the image. In addition, the video can be emailed to an off-site facility to insure the retention of the images.

In another embodiment, the card includes a biometric finger print reader. The card includes a normal finger print data and a panic finger print data so that during normal transactions, the user uses the normal finger. During panic transactions, the user uses the panic finger.

The card can also include a cell-phone like transmitter that sends a signal when the panic PIN or the panic digit is pressed. This broadcast can be relatively short range so that it can be picked up by receivers on order to locate the card. The card can also include a global positioning device so that longer range instruments can be used to locate the card.

The card can also include other general security features to minimize likelihood of unauthorized use, to deter identity theft, and to prevent use of a lost or stolen card. For example, the card can include no imprinted numbers, such that the numbers and other identifying data is not readily apparent. The card number is preferably stored in the cards on-board memory, and further preferably in encrypted form in order to lessen the risk of identity theft. The card can also include biometric devices such as a finger or thumb print reader coded to the user's finger or thumb print, either right or left hand as selected by and set by the user. In a typical embodiment, the finger or thumb print reader faces upward therefore requiring that the user's finger or thumb be placed on the reader in order for the card to operate. The card does not allow transactions without use of the specific user's finger or thumb. Use by other persons causes the card to start the security actions listed above. The card can also include a heartbeat reader or oxygen sensor to ensure that the user's finger or thumb is actually attached to the user. In another implementation, a temperature reader can be used. In another implementation the biometric devices shall be placed at the ATM or other POP device. In this implementation, the card has certain data in its memory in a non-modifiable format, specific to the user such as finger print information as set by the user. For example, only the user knows which of his fingerprints is input into the card's memory thus which finger to use on the biometric device to make the card transaction occur normally. Unless the data on the card matches data gathered by the biometric device on the ATM or POP, the transaction does not occur and the card assumes unauthorized use (or attempted use) and triggers the above-mentioned security actions.

In order to prevent "false alarms" where the user mistakenly triggers the security actions, the card, the ATM, or the POP typically has a procedure to call off the actions.

The card can also function as a means of electronic record-keeping apart from printed receipts, and thus may include a process that records all financial transactions and receipts in the memory, facilitating record keeping by enabling transaction data downloadability. The card can be interfaced with a user's personal computer and interface with personal financial software and other software. The files in which the financial transactions are stored on the computer can be protected so that only the user can access the receipts. The receipts are generally non-modifiable, but are downloadable and erasable by the user. In an embodiment, the card can also include email notification to the user's computer each time a financial transaction is made. The email notification can be linked with a pending file so that when the user interfaces with the computer, a cross check is made with the emails and the downloaded financial transactions. The user can then be notified if there are any discrepancies or unauthorized use. The card could also be made into other formats such as a ring, key chain, or other jewelry.

In another embodiment, the card may be programmed to track the use thereof, such as by vendor frequency or category of goods and services, wherein if desired, such as according to the preferences of the user, targeted marketing could be received by the user according to such use.

In general, in one aspect, the invention features a commercial transactions system, including a commercial transaction machine, a commercial transaction card adapted to interact with the machine, an emergency contact system coupled to the commercial transaction machine, and a process located on the commercial transaction card, the process having instructions to process a personal identification number having N digits to perform a commercial transaction.

In one implementation, the commercial transaction machine is an n automatic teller machine.

In another implementation, the commercial transaction machine is a point of purchase machine.

In another implementation, the process further includes instructions to process a personal identification number having N+M digits to perform an interaction with the emergency contact system.

In another implementation, the instructions reside in a memory located on the commercial transactions card.

In still another implementation, the system further includes a microprocessor located on the commercial transactions card, the microprocessor being adapted to process the instructions.

In yet another implementation, the system further includes a biometric reader located on the commercial transactions card.

In another implementation, the biometric reader is a thumb or finger print reader. In another implementation, the biometric reader is a heartbeat sensor. In another implementation, the biometric reader is a blood-oxygen sensor.

In another implementation, the card can be programmed with two different finger prints.

In another implementation, a first finger print is a normal transactions fingerprint, the finger print being stored on memory on the card.

In another implementation, the second finger print is a panic finger print, the finger print being stored on memory on the card.

In another implementation, the process further includes instructions to process the panic finger print to perform an interaction with the emergency contact system.

In another implementation, the system further includes a high resolution camera connected to the commercial transaction machine.

In another implementation, the system further includes a computer adapted to process video signals from the camera.

In another implementation, the system further includes a process residing on the computer, the process including instructions for causing the video signals to be transmitted to a secure remote location.

In another implementation, the system further includes a transmitter located on the commercial transactions card.

In another implementation, the transmitter is short range.

In another implementation, the system further includes a global positioning unit located on the commercial transactions card.

In still another implementation, the process further includes instructions to record and process financial transactions involving the commercial transactions card.

In another implementation, the system further includes a remote computer adapted to interact with the commercial transactions card.

In another implementation, the remote computer includes a process to download the financial transactions records on the commercial transactions card.

In another implementation, the system further includes personal financial software located on the remote computer, the personal financial software being adapted to interact with the financial transaction records downloaded from the commercial transactions card.

In another implementation, the process on the commercial transactions card includes instructions to send a communication to the remote computer each time a commercial transaction is performed.

In another implementation, the system further includes a data structure located on the remote computer having data related to the communication sent to the remote computer.

In another implementation, the data structure data can be compared with data downloaded from the commercial transactions card.

In another implementation, the system further includes a process located on the remote computer, the process including instructions to make a notification signal if there are discrepancies between the data structure data and the data downloaded from the commercial transactions card.

In still another implementation, the system not only makes it difficult for the card to be used by any user other than the owner, but misuse or forced use under threat results in immediate notice to authorities, facilitating prompt police intervention in on-going crimes, preferably before serious bodily injury to the card user, and further facilitating quick identification and apprehension, as well as effective prosecution of criminals who misuse the card.

In yet another implementation, the system is comprised of the card itself, a card reader for operatively linking the card with a user's computer and/or with a transaction site PC, such as at a retail store; a hand-held card reader for remote transactions, such as for purchase of a beverage during airline travel; a broadcast device operatively linked to the card and the car of a user; a fob for remote broadcast, such as for if the card is discarded after a theft occurs but the user remains a captive victim; and operative and financial software.

In one implementation, the software may be configured to email data to the user from the transaction site in order to avoid the necessity of a print receipt and to minimize the necessary data storage capacity of the card.

One advantage of the invention is that it provides general financial interface capabilities that can be used with commercial transactions machines and the user's own computer.

Another advantage of the invention is that it includes biometric devices to insure that the user is the only person who can use the card.

Another advantage of the invention is that it includes a discreet emergency notification PIN.

Other objects, advantages and capabilities of the invention will become apparent from the following description taken in conjunction with the accompanying drawings showing the preferred embodiment of the invention.

BRIEF DESCRIPTION OF THE DRAWINGS

FIG. 1 illustrates a system level diagram of an embodiment of a secure commercial financial transactions system; and FIG. 2 illustrates an embodiment of a secure commercial transactions card.

DETAILED DESCRIPTION

Referring to the drawings wherein like reference numerals designate corresponding parts throughout the several figures, reference is made first to FIG. 1 that illustrates a commercial transactions system 100. In general, the commercial transactions system 100, includes a commercial transaction machine 110, a commercial transaction card 120 adapted to interact with the machine 110 and an emergency contact system 130 coupled to the commercial transaction machine 110 with a process located on the commercial transaction card 120, the process having instructions to process a personal identification number having N digits to perform a commercial transaction. The commercial transaction machine 110 is typically an automatic teller machine or a point of purchase machine. The process further includes instructions to process a personal identification number having N+M digits to perform an interaction with the emergency contact system 130. Typically, the instructions reside in a memory located on the commercial transactions card 120. The system 100 can also include a microprocessor located on the commercial transactions card 120, the microprocessor being adapted to process the instructions.

The system 100 can also include biometric reader located on the commercial transactions card 120. The biometric reader is a thumb or finger print reader, a heartbeat sensor, a blood-oxygen sensor or a temperature reader.

The system 100 can further includes a high resolution camera connected to the commercial transaction machine 110 and a computer adapted to process video signals from the camera. Typically, the system 100 further includes a process residing on the computer, the process including instructions for causing the video signals to be transmitted to a secure remote location 140.

The system 100 can also include a variety of locator capabilities. For example, the system 100 can includes a short range transmitter located on the commercial transactions card 120. The system 100 can further include a global positioning unit located on the commercial transactions card 120. In general, the card 120 can be in communication with any remote device such as a satellite 160 or local law enforcement 170.

The system 100 may also include not only direct read capabilities, such as for when the card is inserted into or physically scanned by a transaction processing device, but additional means of communication, such as wireless connectability, for example, via BLUETOOTH, infrared, or any other appropriate means of verifiable wireless communication, may also or alternately be utilized to foster transactional communication with a transaction processing device, such as an ATM or other such device.

The process in the system 100 can further include instructions to record and process financial transactions involving the commercial transactions card 120. The system 100 can further includes a remote computer 150 adapted to interact with the commercial transactions card 120. The remote computer 150 can typically include a process to download the financial transactions records on the commercial transactions card 120. The computer 150 can further include personal financial software, such as Quicken located on the remote computer 150, the personal financial software being adapted to interact with the financial transaction records downloaded from the commercial transactions card 120. The process on the commercial transactions card 120 can also include instructions to send a communication to the remote computer 150 each time a commercial transaction is performed. The system 100 can further include a data structure located on the remote computer 150 having data related to the communication sent to the remote computer 150. In general, the data structure data can be compared with data downloaded from the commercial transactions card 120. The system 100 can further include a process located on the remote computer, the process including instructions to make a notification signal if there are discrepancies between the data structure data and the data downloaded from the commercial transactions card 120.

FIG. 2 illustrates an embodiment of a secure commercial transactions card 200. The card 200 can generally include a main body 210 generally being comprised similarly to conventional credit cards. The card 200 can include a microprocessor and memory 220. The card 200 can also include one or more batteries 230. The card 200 can further include biometric devices 240 and a transmitter 250. The card 200 typically further includes a reader interface 260. The embodiments described herein typically anticipate the embodiment of the card 200 as described above. However, it is understood that several modifications can be made that are within the scope of the embodiments described. For example, it is intended that card 200 is a multi-feature transactional device that enhances user safety, provides a means of user identity verification, minimizes risk of fraud, facilitates record keeping, and functions as a data collection tool for target marketing.

ATM and POP Security Features

As described above, there are several features of the secure commercial transactions system that can be implemented. The following description describes some more specific embodiments of the features. The card can offer some protection from fraud and misuse and armed robbery at ATM machines as explained below. An exemplary purpose of the card is to insure security of credit card/ATM transactions, to offer electronic record keeping and receipts, and to facilitate record keeping by transaction download ability. The security devices are to not only make it difficult to use except by the owner, but also give notice to authorities of misuse or use under threats that generally facilitate prompt police intervention in on-going crimes before the situation escalates and hopefully protect the victim from further violence, quick identification and apprehension of the criminals who misuse the card and effective prosecution of criminals who misuse the card.

As stated above, in a typical implementation, the ATM security incorporated in the card is as follows: The card works in any commercial transactions machine such as an ATM and has a 4-6 digit PIN. An entirely different number or merely the last number, to be chosen by the customer, is a code. If the customer uses his regular code number, the transaction is normal. If the customer uses the "panic" code number, the transaction appears to be normal in all ways to the customer/criminal at the ATM. (The criminal has no notice whatsoever that the "panic" number was used.)

In another embodiment, the ATM/POS or the card can be equipped with a biometric reader such as a finger print reader. When the user first obtains the card, he or she chooses which one of their fingers is the normal transaction finger and which finger is the panic finger. The card stores the normal and panic finger print data and is optionally encrypted on the card's memory. The data is stored and the user is unable to alter it once it is stored. In addition, an unauthorized user is not able to retrieve the finger print or other data from the card's memory.

If the user uses the "normal" fingerprint or regular PIN during the transactions, the transactions are normal. If the user uses the panic PIN or panic finger print, the transaction appears normal in all ways to the unauthorized user or criminal at the ATM or POP. The unauthorized user or criminal has no notice whatsoever that the panic finger or PIN has been used.

The use of the "panic" number or finger print causes a number of things to happen, including but not limited to the following:

(1) The ATM records an incident code on the card's memory chip and the incident code is broadcast. According to an alternate embodiment, it is envisioned that the incident code may be broadcast by a related transmitter in the user's vehicle, a key fob, and a cellular telephone in lieu of and/or in addition to the card. The ATM also sends a message via a preset phone number or email address to the nearest Police (or 911) station that a crime is in progress at that particular ATM. The ATM also transmits data on the name description and other information of the user. The data can be as detailed as the bank or user wants and can include such information as photos, automobile descriptions, phone numbers, age, race, height, weight and the like.

(2) The camera at the ATM automatically goes into a clear, higher resolution mode so that the entire area is clearly visible on the recording. Also, the recording is automatically saved until it is erased by the police. Digital copies are made and sent via email to an off-site storage facility to insure retention of photos.

(3) The card includes a cell phone like transmitter. Upon use of the card with the "panic" finger print or code, a signal begins to be broadcast that can be picked up by the police. The signal is just strong enough for reception out a few miles (so that it can either be picked up by the police or by cell phone towers). This feature helps locate the card and possibly the victim. Typically, the cell phone transmitter is implemented with existing technology. In one embodiment, the card can include a half-duplex transmitter broadcasting in normal FM band as a cell phone. In one implementation, the transmission can be in GSM or other cell phone standards. It is envisioned that the transmitter element of the card may have a plurality of applications. For example, a child could be tracked by a parent, or a vehicle could be tracked by its owner, both either openly or covertly. Such embodiments would likely be most effectively incorporated into a rechargeable form of the card.

The card typically does not need to continuously broadcast. Once the panic mode is started, the ATM gives the first notice to the police, who receive all the available data regarding the fact that the crime is being committed, the location of the ATM, and the data regarding the user, including the ID data on the card. The broadcast from the card is merely the incident code and the ID. The purpose of the incident code is to insure that the broadcast is sent to the correct police station (or other authority). This broadcast can be sent every few minutes. Thus, with the starting point of the initial ATM transmission and interim broadcasts that are received by the cell towers, the police are able to locate the following: (a) the general direction of travel of the card (and presumably the criminal); and (b) the cell in which the card is located after any broadcast.

The exact location of the card can be determined as follows: Using the data of the initial ATM and subsequent broadcasts, the police can plot the travel of the card. Inasmuch as the broadcasts are merely radio signals, once the police limit the search to one cell, they can use multiple units with directional receivers to triangulate the location of the card.

In a typical embodiment, the card's panic function is a one-time only use. Once the panic function is used, the card is replaced to insure that the next time it is needed, the panic function is fully powered. This feature eliminates the need to recharge the battery (but not the need to check the power each time it is used at a POS and replaced if the power is low). In another embodiment, the card can include a rechargeable battery and that implements a technology without a memory problem. Each time the user uses the card, the ATM or home reader checks the battery for its charge and if it needs charging, the computer or other reader charges the battery, or notifies the user that the battery needs charging. The user can also receive a status report of the battery life and notice to replace the card when the battery approaches the end of its useful life.

Another aspect of the card is its need to not continually broadcast. As such, the battery life is preserved and the signal strength of the broadcast remains strong. In one embodiment, the card can include a capacitor to store charge in order to concentrate the power and fire the broadcast is a very short, powerful burst.

(4) Because the idea is to make sure the criminal is not notified of the use of the "panic" finger or code and because some criminal may have sufficient technology to pick up a broadcast signal, the card, after any use, sends out regular signals. If the "panic" finger or code is not used, the signal is merely a decoy.

(5) As described above, the card can have a normal PIN, normal finger print and panic finger print. Using the card with a panic finger causes a series of events. In a typical embodiment, the card can enable the ATM or other commercial transaction machine to send a crime code to the police so that the police have notice that the crime is in progress at the machine. The machine can also send the card user's name, description, automobile type and the like so that the police have a better chance to locate the victim. The camera can be programmed to save the recording and create higher resolution and a wider view.

(6) In a situation where the panic finger or code has been mistakenly used, the user can use his normal finger or code to cancel the panic functions. If the user uses the panic finger or code but does not recognize that he used it, the user cannot stop the panic function. In such a situation, the user can pay a fee similar to home security users who mistakenly and repeatedly have false alarms. In another embodiment, a discreet signal can be sent to the users cell phone, pager or other PDA that is innocuous for each panic mode or normal mode, and if there is an error, the user can then send the normal code to stop the panic function.

(7) In another embodiment, once the card is activated, a similar activation can occur in the user's car. This event helps to eliminate the possibility that the broadcast ceases if the criminal discards or destroys the card after the first use. If the criminal does throw away or destroy the card, the user is protected because his car starts the broadcast. The device in the car includes a battery charged by the car's electrical system. This feature prevents the criminal from disconnecting the battery. The car broadcasts similar signals but further includes an identifier within the broadcast to identify the broadcast as coming from the car as opposed to the card. In another embodiment, a separate card or device (such as a key chain) can similarly broadcast a signal. The secondary device can be any suitable form factor such as lipstick, face powder compact, key chain fob, money clip, or some device in the purse lining. In one implementation, an available communications service such as On-Star can be used as the communications medium. In still another embodiment, the card can be used as an anti-theft device in which the car is equipped with a reader and it is necessary to scan the card to start the car.

(8) In another alternate embodiment, the available balance to a user's account could be reset by initiation of the "panic"

mode at an ATM, wherein a balance inquiry would report the new, lower reset total to prevent detection by the criminal. In such an embodiment, it is considered that the reset could be configured to require intervention by a bank representative or by law enforcement for activation. When activated, such a reset would limit the funds available for withdraw over a period of days, rather than the traditional daily limit, and yet would appear to the criminal to simply be an exhaustion of deposited funds.

General Security Features

The card has general security devices on it as well, in order to minimize likelihood of unauthorized use, to deter identity theft, and to prevent use of a lost or stolen card. In a typical embodiment, the card does not have numbers pressed into it; that is, the card may include no imprinted numbers or identifying data, such that no owner or account information is visibly apparent. Instead, all the numbers and identifying data are imbedded in the chip memory, in encrypted form. As stated, this feature aids to prevent anyone from obtaining the numbers directly from the card, whether lost, stolen, or otherwise.

The additional security devices are a thumb or finger print reader coded to the individual customer's thumb or finger print as set by the user. The thumb or finger print reader is generally centered in the card and it is inserted into the reader, finger or thumb print reader up. The user can use either finger or thumb as they choose at the beginning (it is set by the issuer at the time of issue).

In one embodiment, a finger or thumb reader can be placed at the transaction site. The card can also include the data of the finger or thumb print of the user. The reader at the transaction site can read the print from the customer's thumb or finger and compare that data to the data on the card. In order for the transaction to commence, the data has to match.

In other embodiments, the reader can be imbedded on the card itself so that it functions only with a particular user. This feature generally simplifies the transaction site functions and also allows the card to be used at the users PC site without having to have a reader at the PC. Similar to a reader on the ATM, the reader on the card includes both a normal and panic finger.

Other general security devices include a heart beat reader. This implementation arises from fear that a criminal could remove the thumb or finger of the customer and use it to activate the card (assuming that the criminal knows which finger or thumb to use). A temperature reader or blood-oxygen sensor could further be implemented. Therefore, unless the thumb used to activate the card includes a heartbeat, the card does not function and goes into panic mode.

In another implementation, the card can be programmed so that it does not function if it is damaged by magnetic fields, unauthorized programming and the like. If the card does not receive the required security data as encrypted by the user, the card does not function. Furthermore, as part of other general security features, any use of the card that fails because of a violation of the general security devices described above can cause the card to go into a panic mode as described herein. This feature functions to assist the apprehension of the person attempting to misuse the card or use the card without authorization.

Even further, in another implementation and/or embodiment the card may be adapted to broadcast its location via global positioning satellite (GPS) functionality, such that the card could have a GPS receiver functionally related thereto, wherein the GPS receiver could be further adapted to broadcast its location in a police designated frequency, or could utilize a standardized frequency.

Financial Paperwork and Other Software Interaction

To avoid the retaining of receipts and the input of data on home or business financial programs, several features of the system can be implemented. There are programs that automatically download some information regarding credit card transactions, but these systems can be limiting. In addition, several paper receipts must be input. The card can keep electronic receipts from all transactions. When the customer gets home or back to the office, he puts the card into his PC and the data from the card downloads into his PC and automatically goes into his financial software (Quicken, for example). If he needs to add additional information, category information for example, then he can within the Quicken data file. Thus, the card may function as a means of electronic recordkeeping, apart from printed receipts, wherein an on-board process records all financial transactions and receipts into memory, facilitating recordkeeping by enabling transaction data downloadability.

Regarding receipts, the card includes electronic receipts that are not modifiable by the customer. This feature allows the customer to prove purchase should he need to return merchandise or prove that he paid something. These receipts can only be downloaded into a read only file in the PC. These downloaded receipts are typically in a protected file that can not be manipulated by the customer. Additional security and records protection are available in digital, off-site recording of the customer's data.

Another alternate application of use in lieu of and/or in addition to financial data management is medical information management. That is, medical information and records could be stored on the card, in non-alterable form, wherein access protocols may be defined to enable access to the data by medical personnel and/or emergency workers.

Another aspect of the card is an email cross-check. When the card is used, it sends via email a notation of the charge (vendor, date, and amount) to the PC of the customer. It places the notation in a pending file and when the card is placed in the PC reader at the customer's home, the computer compares the email data to the data from the card. If there are discrepancies, then the customer is notified by the PC so that the discrepancy can be analyzed and corrected. Thus, in one implementation, the software may be configured to email data to the user from the transaction site in order to avoid the necessity of a print receipt and to minimize the necessary data storage capacity of the card, wherein, if such an option is operatively selected by the user, no on-board memory storage would occur during a given transaction, but rather an email record would transmit automatically.

The key aspects of this device are security and ease of gathering and recording of transaction information. All of the features of the system can be embedded into a ring or key chain device or other small jewelry. In that device, the ring could obtain power from the reader at the retail outlet or the home PC when the device is used. In the ring device, the reader part is typically on the palm side, perhaps a raised square. Further, any one or more of the beneficial aspects and functions of the card device and system, as described herein, may be incorporated into a cellular telephone, other personal data assistant device, and/or handheld computer.

Additionally, it is considered that the card described herein could serve as a platform for a plurality of credit accounts of a user. For example, a user's bank issued credit card data may be stored in the card, along with other credit card data, wherein at the time of purchase, the user may select which credit card account to use for the transaction.

Still further, the card may be programmed to track the use thereof, such as by vendor frequency or category of goods and services, wherein if desired, such as according to the preferences of the user, targeted marketing could be received by the user according to such use.

The systems described above can be used by a variety of users. For example, those people who keep electronic financial data benefit from the use of the card. Banks can benefit from the card given the inherent safety features. Another example of people who can benefit are those who use paperless transactions. An additional reader, such as a handheld reader, can be provided with the system so that organizations such as airlines can accept the card and use the reader to scan the card. The data can be sent to the airplane's computer and downloaded to the airport where the date can be processed by the financial institution. The device can include a suitable biometric reader such as a finger print, palm, iris reader, or the like. It is understood that there are various people and organizations that can implement the embodiments described herein. Further, it is preferred that the user may have the option to select which body part, such as which digit, shall be utilized for "normal" transactions, and which is for "panic" transactions. According to such an embodiment, following programming of the selected identifying biometric data, such data is preferably inaccessably encrypted on the card, wherein alteration is not enabled. Thus, if the user wishes to change the identifying biometric data, a new card must be issued and programmed.

The software techniques and methods discussed above can be implemented in digital electronic circuitry, or in computer hardware, firmware (as discussed), software, or in combinations of them. Apparatus may be implemented in a computer program product tangibly embodied in a machine-readable storage device for execution by a programmable processor; and methods may be performed by a programmable processor executing a program of instructions to perform functions by operating on input data and generating output. Further embodiments may advantageously be implemented in one or more computer programs that are executable on a programmable system including at least one programmable processor coupled to receive data and instructions from, and transmit data and instructions, to a data storage system, at least one input device, and at least one output device. Each computer program may be implemented in machine language or assembly language which can be assembled or translated, or a high level procedural or object-oriented programming language, which can be complied or interpreted. Suitable processors include, by way of example, both general and special purpose microprocessors. Generally, a processor receives instructions and data from read-only memory and or RAM. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially designed application specific integrated circuits (ASICs).

The foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. A secure commercial transaction system, comprising:
a transactional device, said transactional device having a form selected from the group of a card, a key fob, an article of jewelry, a lipstick, a face powder compact, a money clip, and a purse, said transactional device further comprising a microprocessor and data memory storage, and said transactional device further comprising a transmitter;
wherein operation of said transaction device requires user identification confirmation,
wherein said user identification confirmation requires a user input of either a first operational signal and a comparison of said user input with a first operational user identification data stored in said data memory storage on said transactional device for activation of a first operational mode, or user input of a second operational signal and comparison of said user input with a second operational user identification data stored in said data memory storage on said transactional device for activation of a second operation mode, and
wherein said second mode of said transactional device initiates a transmission of an automated transmission from said transmitter.

2. The secure commercial transaction system of claim 1, wherein said first operational user identification data is a first personal identification number and wherein said second operational identification data is a second personal identification number.

3. The secure commercial transaction system of claim 1, wherein said second operation mode of said transactional device initiates transmission of an automated emergency notification alert message to an emergency service provider.

4. The secure commercial transaction system of claim 3, wherein said emergency notification alert message further comprises descriptive identification data regarding the user of said transactional device.

5. The secure commercial transaction system of claim 1, wherein said automated transmission initiated by said second operation mode of said transactional device directs a camera at a location proximate said transaction device to function according to high resolution parameters.

6. The secure commercial transaction system of claim 1, wherein said automated transmission initiated by said second operation mode of said transactional device directs a camera at a location proximate said transactional device to retain image data in a protected format.

7. The secure commercial transaction system of claim 1, wherein said automated transmission initiated by said second operation mode of said transactional device directs a camera at a location proximate said transactional device to email image data to a remote location.

8. The secure commercial transaction system of claim 1, wherein said transactional device further comprises a biometric reader, and wherein said first operational user identification data is a first biometric data and wherein said second operational identification data is a second biometric data.

9. The secure commercial transaction system of claim 8, wherein said biometric reader is selected from the group consisting of an oxygen sensor, a pulse reader, a fingerprint reader, a retinal scanner, a genetic scanner, and a temperature reader.

10. The secure commercial transaction system of claim 1, wherein said transaction device further comprises a transmitter, and wherein said second mode of said transaction device initiates a transmission of an automated transmission from said transmitter.

11. The secure commercial transaction system of claim 1, wherein said transactional device is a card, and wherein said card further comprises no visible data.

12. The secure commercial transaction system of claim 1, wherein said first operation mode of said transactional device enables a transaction, wherein data from said transaction is stored in said data memory storage of said transactional device, and wherein said data from said transaction is retrievable.

13. The secure commercial transaction system of claim 1, wherein said first operation mode of said transactional device enables a transaction, and wherein data from said transaction is transmitted via email.

14. The secure commercial transaction system of claim 1, wherein said transactional device is programmed to track use details relevant to facilitating direct marketing targeted to the user of the transactional device.

15. The secure commercial transaction system of claim 1, wherein said transactional device is adapted for operative direction of a transaction utilizing a platform selected from the group consisting of a commercial transaction machine, an automated teller machine, a point of purchase machine, a transaction site personal computer, a vehicle broadcast reception device, and a handheld card reader device.

16. The secure commercial transaction system of claim 1, wherein said transactional device is adapted for wireless remote transactional communication and operation.

17. The secure commercial transaction system of claim 1, further comprising a receiver and transmitter device functionally related to said transactional device, wherein said second operation mode of said transactional device initiates a transmission from said transactional device to said related receiver and transmitter device, wherein said receiver and transmitter device broadcasts an automated emergency notification alert message.

18. The secure commercial transaction system of claim 1, wherein said transmission is selected from the group consisting of global positioning signal, cellular telephone signal, and a half-duplex transmitter broadcast in FM band.

19. The secure commercial transaction system of claim 1, wherein said commercial transaction is selected from the group consisting of a tracking transaction for location of an individual or vehicle and a medical transaction.

20. The secure commercial transaction system of claim 1, wherein after a transaction according to said second operation mode, said transactional device is rendered inoperable.

21. The secure commercial transaction system of claim 1, wherein said transactional device further comprises a plurality of credit card account's data, and wherein a transaction is selectively related to one of said plurality of credit card accounts.

22. A secure commercial transaction system of claim 11, comprising:
    a transactional device, said transactional device having a form selected from the group of a card, a key fob, an article of jewelry, a lipstick, a face powder compact, a money clip, and a purse, and said transactional device further comprising a microprocessor and data memory storage;
    wherein operation of said transaction device requires user identification confirmation,
    wherein said user identification confirmation requires a user input of either a first operational signal and a comparison of said user input with a first operational user identification data stored in said data memory storage on said transactional device for activation of a first operational mode, or user input of a second operational signal and comparison of said user input with a second operational user identification data stored in said data memory storage on said transactional device for activation of a second operation mode, and
    wherein said first operation mode of said transactional device enables a transaction,
    wherein data from said transaction is stored in said data memory storage of said transactional device,
    wherein said data from said transaction is retrievable,
    wherein said data from said transaction is also transmitted via email, and
    wherein upon retrieval of said data from said transaction from said data memory storage of said transactional device, comparative assessment of both sets of transactional data may occur.

* * * * *